Oct. 9, 1951  D. I. HARVEY  2,571,034
POULTRY PLUCKING MACHINE
Filed March 12, 1947  3 Sheets-Sheet 1

Dillis I. Harvey
Inventor

By Clarence A. O'Brien
and Harvey B. Jacobson
Attorneys

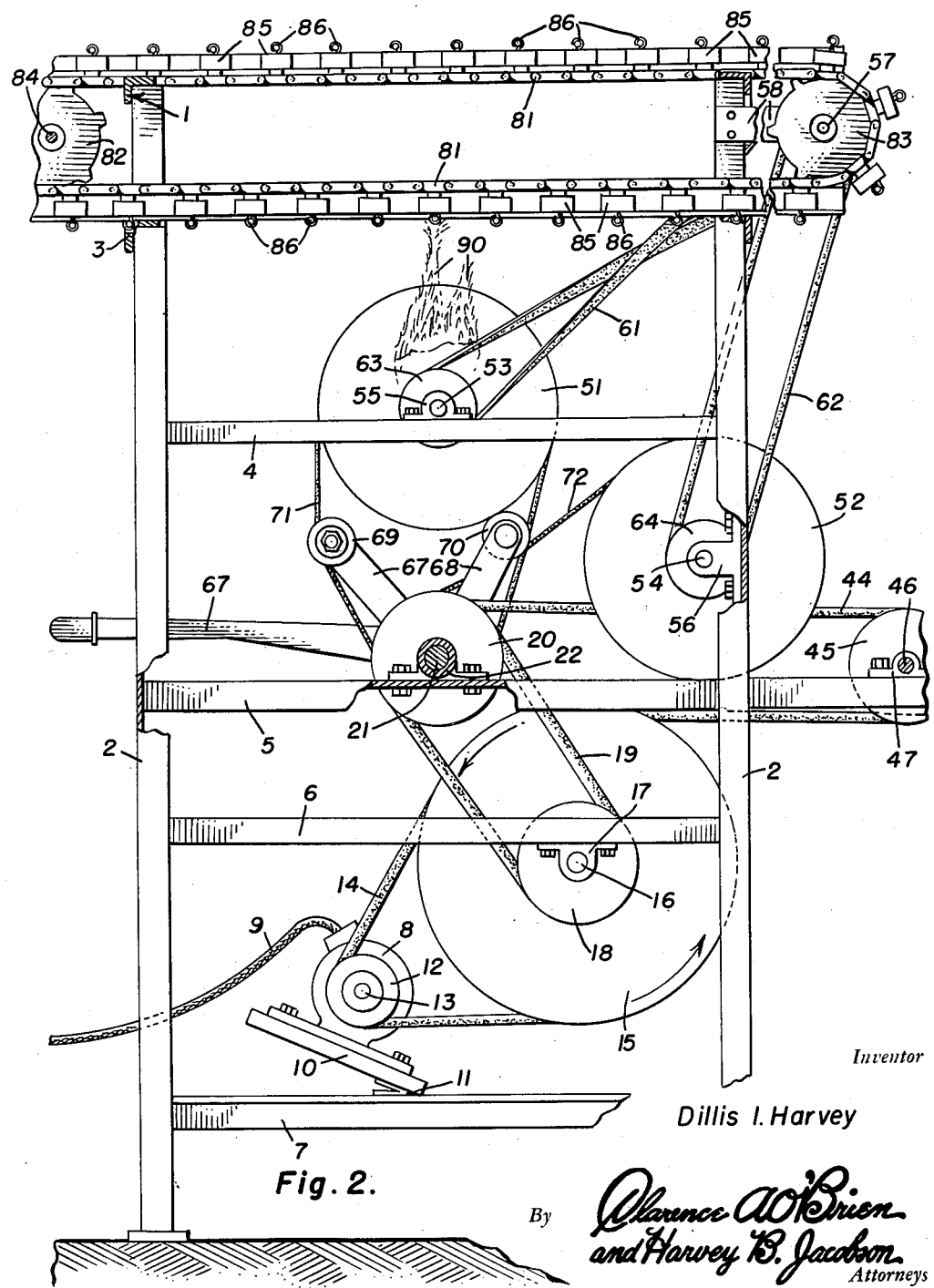

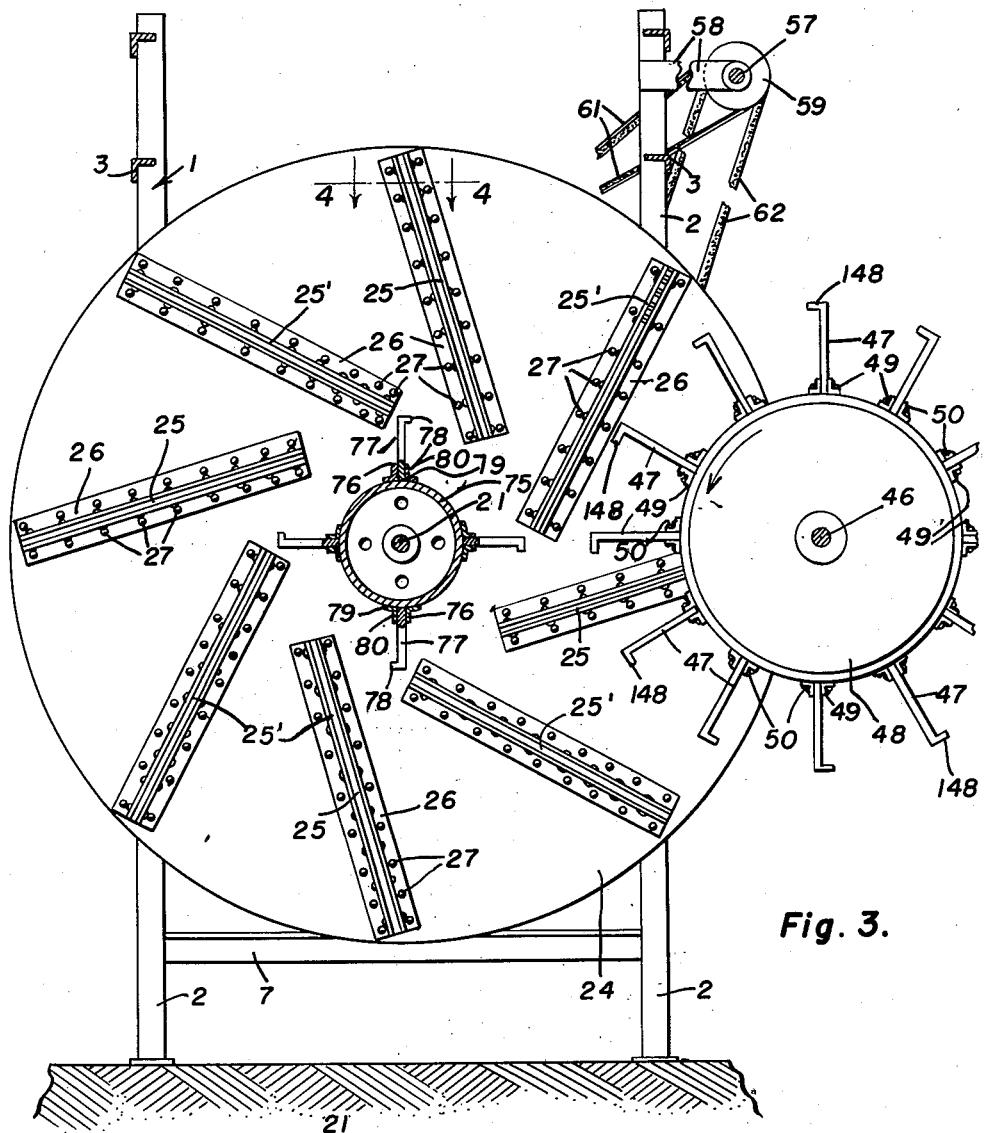

Patented Oct. 9, 1951

2,571,034

UNITED STATES PATENT OFFICE 2,571,034

POULTRY PLUCKING MACHINE

Dillis I. Harvey, Plainwell, Mich.

Application March 12, 1947, Serial No. 734,125

4 Claims. (Cl. 17—11.1)

This invention relates to improvements in poultry plucking machines.

An object of the invention is to provide an improved mechanically operated motor driven poultry plucking machine.

Another object of the invention is to provide an improved mechanically operated motor driven poultry plucking machine including a pair of rotatably supported adjustable disk wheels having plucking fingers supported thereon adapted to engage the fowl or poultry after the same has been killed, as it is fed to and between the spaced disk plucking wheels, said poultry being supported upon an endless carrier and movable in either direction with respect to said rotary disk plucking wheels.

A further object of the invention is to provide an improved mechanically operated motor driven poultry plucking machine including variably spaced rotary disk plucking wheels having plucking fingers or brushes disposed upon the inner opposed surfaces thereof, together with means for varying the space between said disk wheels by moving the adjustable wheel toward or away from the fixed wheel, whereby various sizes of poultry may be efficiently and thoroughly plucked as the poultry is passed between the plucking wheels supported upon a movable endless conveyor or carrier.

Another object of the invention is to provide an improved mechanically operated motor driven poultry plucking machine which will be highly efficient in operation, and relatively inexpensive to manufacture and produce.

Other objects will appear as the description proceeds.

In the accompanying drawings which form a part of this application,

Figure 2 is a view taken on the line 2—2 of Figure 1;

Figure 3 is a view taken on the line 3—3 of Figure 1;

Figure 4 is a sectional view taken on the line 4—4 of Figure 3;

Like characters of reference are used throughout the following specification and the accompanying drawings to designate corresponding parts.

Figures 1, 5, 6, 7:
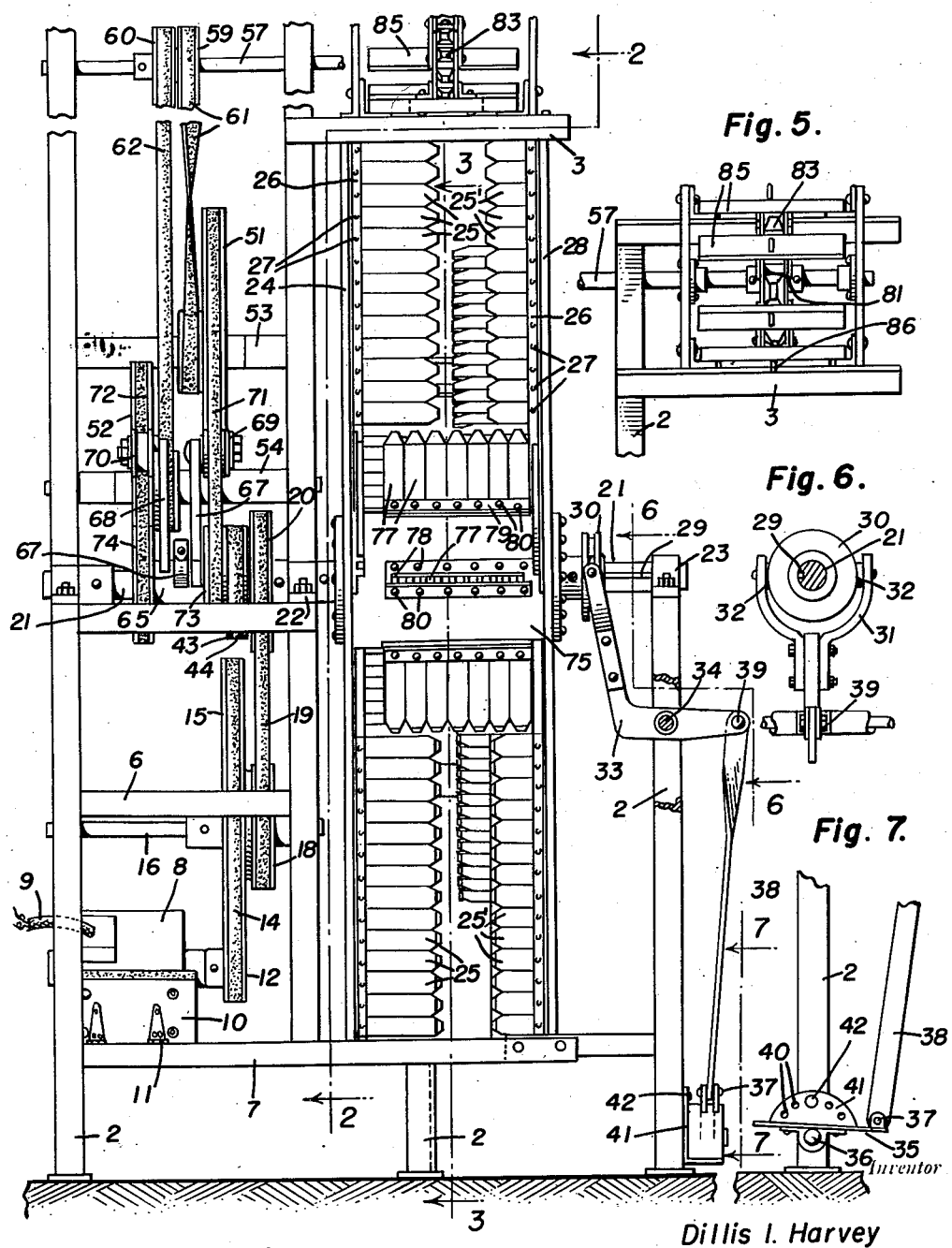
Figure 1 is a front elevation of the improved poultry plucking machine.
Figure 5 is an end elevation of the conveyor from which the poultry is suspended while being plucked.
Figure 6 is a view taken on the line 6—6 of Figure 1.
Figure 7 is a view taken on the line 7—7 of Figure 1.

In carrying out the invention, there is provided an angle iron frame generally denoted by the reference numeral 1 comprising the vertical legs 2 and the transversely extending horizontal bracing legs 3, 4, 5, 6 and 7, disposed from the top to the bottom of the said frame 1.

An electric driving motor 8 is connected by means of the conductor cable 9 to any suitable source of electric current supply (not shown) and is secured to the base 10, being hinged at 11 to the lowermost leg 7 of the frame 1, as clearly illustrated in Figures 1 and 2 of the drawings.

The pulley 12 of the electric shaft 13 will be connected by the belt 14 to a large pulley wheel 15 secured to the shaft 16 mounted between the bearings 17 on the cross legs 6 of the frame 1, and a small pulley wheel 18 fixed on said shaft 16 is connected by means of the belt 19 to the pulley 20 fixed upon the shaft 21 mounted for rotation between the bearings 22 and 23 disposed on the cross legs 5 of the frame 1.

The poultry plucking disk wheel 24 is fixed upon the shaft 21 and supports the alternate series of long and short rubber plucking fingers 25 and 25' which are joined at their inner ends and are secured to said wheel 24 by means of the metal angle iron brush supporting strips 26, held in position by means of the fasteners 27. The brushes comprising the fingers 25 and 25' are arranged in a pattern on the wheel 24 at angles to the radii of said wheel, with their outer ends terminating adjacent the periphery of said wheel. The pattern or arrangement of each series of fingers is such that the series when extended at its end adjacent the axis of the wheel is tangent to a common circle smaller than but concentric with the wheel 24.

A similarly formed plucking wheel 28 is secured to the shaft 21 by means of the key 29 and the clutch collar 30, which permits the movement of the wheel 28 toward and away from the plucking wheel 24 fixed upon the shaft 21 for rotation therewith. A yoke 31 is formed with the inwardly directed fingers 32 for engagement with the clutch collar 30, said yoke being disposed on the upper end of a bell crank lever 33 which is pivoted at 34 to the upper right leg 2 of the frame 1, set off from one side of said main frame 1, so that the side of the machine may be removed and access had to the various parts thereof. A foot treadle 35 is pivoted at 36 to the lower part of the leg 2 and is pivotally connected at 37 to a link 38 whose upper end is pivotally connected at 39 to the adjacent end of the bell crank lever 33. Arcuately disposed apertures 40 are formed through the arcuate portion 41 of the treadle 35 and are provided for supporting a locking pin 42 used for holding the plucking wheels at the desired spaced position from each other.

A pulley wheel 43 is secured to the shaft 21 adjacent the pulley 20 and is connected by the belt 44 with the pulley 45 on the shaft 46 mounted in the bearings 47. A small plucking wheel 48 is secured to the shaft 46 for positioning intermediate the large plucking wheels 24 and 28 at one side edge thereof, being formed with the spaced radially extending rubber plucking fingers 77 bent at right angles as at 148 at their outermost extremities, and secured to said wheel 48 by means of the metal angle strips 49 and fastening screws or rivets 50. The wheel 48 may be pivotally mounted for movement toward and away from the plucking wheels 24 and 28 so that the same may be moved into position when it is desired to use the wheel, and may be moved outwardly to get the same out of the way when it is not to be used.

The large pulley wheels 51 and 52 are secured to the shafts 53 and 54 respectively, the same being rotatably mounted in the bearings 55 and 56 on the cross leg 4 and on the vertical leg 2 of the frame 1.

A conveyor driving shaft 57 is mounted on the bracket 58 at the top of the frame 1, and supports the similar sized pulley wheels 59 and 60 which are connected by the belts 61 and 62 with the small pulley wheels 63 and 64 mounted respectively on the shafts 53 and 54.

A sleeve 65 is rotatably supported upon the shaft 21 and carries an operating handle 66 extending outwardly therefrom. The sleeve 65 also integrally supports the upwardly extending angularly disposed belt tightening arms 67 and 68, which support the belt engaging and tightening pulleys 69 and 70 respectively on their outer ends.

The belt tightening pulleys 69 and 70 are adapted to alternately engage and tighten the belts 71 and 72 connected between the large pulley wheels 51 and 52 and the small pulley wheels 73 and 74 mounted upon the shaft 21 to be rotatable therewith.

A small hub or drum 75 is fixed upon the shaft 21 between the poultry plucking disk wheels 24 and 28, and supports four radially extending rubber plucking brushes 76 comprising the series of rubber plucking fingers 77 which are bent as at 78 at their outer extremities, said brushes 76 being attached to the hub or drum 75 by means of the angle strips 79 and fasteners 80.

Disposed above the poultry plucking disk wheels 24 and 28 and arranged longitudinally and directly thereabove is the endless conveyor chain 81 mounted between the sprocket gears or wheels 82 and 83 secured respectively upon the shafts 84 and 85. The chain 81 supports the spaced transversely extending blocks 85 in which the screw hooks 86 are supported, whereby the poultry to be plucked will have their feet tied together and suspended upon the several hooks 86. As the motor 8 drives the several rotary plucking wheels, the conveyor chain 81 will be also driven to carry the poultry between the large plucking wheels 24 and 28 to be engaged by the rubber plucking fingers on the rapidly rotating plucking wheels, whereby the feathers will be plucked from the poultry in a matter of seconds.

In the event that one man will operate the machine alone, he will operate the belt tightening lever 67 to alternately tighten the belts 71 and 72 which will permit of a forward and reverse driving of the endless chain carrier 81 so that the poultry to be plucked will be placed upon the carrier and run through between the plucking wheels, after which the lever 67 will be moved in its opposite direction to reverse the direction of the carrier 81 to return the plucked poultry to the operator.

From the foregoing description, it will be seen that there has been devised and provided a highly efficient form of poultry plucking machine which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A poultry plucking machine including a frame, a shaft rotatably supported thereon, a poultry plucking disk wheel fixed upon said shaft, a shiftable poultry plucking disk wheel slidably mounted on said shaft for movement toward and away from said fixed wheel, alternate rows of long and short resilient plucking fingers on the inner opposed surfaces of said plucking wheels, said rows of fingers being arranged in a pattern whereby the rows when extended at their ends adjacent the axis of the wheels are tangent to a common circle smaller than and concentric with each plucking wheel, treadle operated means for selectively varying the space between said wheels, means for locking said wheels in the desired adjusted position, a hub mounted on said shaft between said first mentioned plucking wheels and including radially extending, resilient plucking fingers, and power operated means for driving all of said wheels and said hub.

2. The subject matter as claimed in claim 1, and a power driven conveyor chain disposed longitudinally of and above said plucking wheels for supporting poultry to be plucked and for moving the same between said rotating plucking wheels.

3. The subject matter as claimed in claim 1, a power driven conveyor chain disposed longitudinally of and above said plucking wheels for supporting poultry to be plucked and for moving the same between said rotating plucking wheels, and means for reversing the direction of movement of said conveyor chain.

4. The subject matter as claimed in claim 1, a power driven conveyor chain disposed longitudinally of and above said plucking wheels for supporting poultry to be plucked and for moving the same between said rotating plucking wheels, and manually operated belt tightening means for reversing the direction of movement of said conveyor chain.

DILLIS I. HARVEY.

REFERENCES CITED

The following references are of record in the file of this patent:

UNITED STATES PATENTS

| Number | Name | Date |
|---|---|---|
| 315,687 | Whiting | Apr. 14, 1885 |
| 335,742 | Bush | Feb. 9, 1886 |
| 1,372,595 | Bouda | Mar. 22, 1921 |
| 2,444,556 | Drews | July 6, 1948 |

FOREIGN PATENTS

| Number | Country | Date |
|---|---|---|
| 494,437 | France | May 30, 1919 |